US010123204B2

United States Patent
Dai et al.

(10) Patent No.: US 10,123,204 B2
(45) Date of Patent: Nov. 6, 2018

(54) SPLITTING METHOD, BASE STATION, AND USER EQUIPMENT

(71) Applicant: HUAWEI TECHNOLOGIES CO., LTD., Shenzhen (CN)

(72) Inventors: Mingzeng Dai, Shanghai (CN); Qinghai Zeng, Shanghai (CN); Yi Guo, Shangahi (CN); Hongping Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 192 days.

(21) Appl. No.: 15/098,776

(22) Filed: Apr. 14, 2016

(65) Prior Publication Data

US 2016/0234687 A1 Aug. 11, 2016

Related U.S. Application Data

(63) Continuation of application No. PCT/CN2013/085340, filed on Oct. 16, 2013.

(51) Int. Cl.
*H04W 12/06* (2009.01)
*H04W 12/04* (2009.01)
(Continued)

(52) U.S. Cl.
CPC ......... *H04W 12/06* (2013.01); *H04L 63/0457* (2013.01); *H04W 12/04* (2013.01);
(Continued)

(58) Field of Classification Search
CPC . H04L 63/04; H04L 63/0428; H04L 63/0435; H04W 12/06; H04W 72/0413; H04W 72/042; H04W 84/12; H04W 88/06
See application file for complete search history.

(56) References Cited

U.S. PATENT DOCUMENTS 9,106,421 B1 * 8/2015 Singh ................ H04L 9/0827
2013/0088983 A1 4/2013 Pragada et al.
(Continued)

FOREIGN PATENT DOCUMENTS

CN 102215530 A 10/2011
CN 102740366 A 10/2012
(Continued)

OTHER PUBLICATIONS

International Search Report dated Jul. 23, 2014, in corresponding International Application No. PCT/CN2013/085340.
(Continued)

*Primary Examiner* — Khang Do
(74) *Attorney, Agent, or Firm* — Staas & Halsey LLP (57) ABSTRACT

Embodiments of the present invention provide a splitting method, a base station, and user equipment. The method in the present invention includes: sending, by a base station, an authentication indication to user equipment; acquiring, by the base station, an authentication status report indicating that the user equipment is admitted to the WLAN; and determining, by the base station according to the authentication status report, that the base station exchanges, with an access point of the WLAN, a first data stream of a data stream to be processed, where the data stream to be processed is a data stream that is to be sent by the base station to the user equipment or a data stream that is to be sent by the user equipment to the base station.

14 Claims, 5 Drawing Sheets

(51) Int. Cl.
   *H04L 29/06* (2006.01)
   *H04W 72/04* (2009.01)
   *H04W 84/12* (2009.01)
   *H04W 88/06* (2009.01)
   *H04W 28/08* (2009.01)

(52) U.S. Cl.
   CPC ..... *H04W 72/042* (2013.01); *H04W 72/0413* (2013.01); *H04W 28/08* (2013.01); *H04W 84/12* (2013.01); *H04W 88/06* (2013.01)

(56) References Cited

U.S. PATENT DOCUMENTS

| | | | |
|---|---|---|---|
| 2013/0242897 A1 | 9/2013 | Meylan et al. | |
| 2013/0301611 A1* | 11/2013 | Baghel | H04W 72/04 370/331 |
| 2014/0029570 A1* | 1/2014 | Lee | H04W 36/0005 370/331 |
| 2014/0079007 A1* | 3/2014 | Li | H04W 28/10 370/329 |
| 2014/0153546 A1* | 6/2014 | Kim | H04W 48/18 370/332 |
| 2014/0181904 A1* | 6/2014 | Craig | H04W 12/04 726/3 |
| 2014/0211626 A1 | 7/2014 | Liu | |
| 2014/0341038 A1* | 11/2014 | Lim | H04W 28/08 370/235 |
| 2015/0156774 A1* | 6/2015 | Urie | H04L 5/001 370/329 |

FOREIGN PATENT DOCUMENTS

| | | |
|---|---|---|
| EP | 2 704 481 A1 | 3/2014 |
| WO | 2013/040978 A1 | 3/2013 |
| WO | 2013/100629 A1 | 7/2013 |

OTHER PUBLICATIONS

"Future Smartphone solution White Paper", Huawei, Issue 2, Sep. 17, 2012, pp. 1-32.

"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.3.0, 3rd Generation Partnership Project, Jun. 2013, Valbonne, France, pp. 1-57.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0, 3rd Generation Partnership Project, Sep. 2013, Valbonne, France, pp. 1-347.

"3rd Generation Partnership Project; Technical Specification Group Radio Access Network; Evolved Universal Terrestrial Radio Access Network (E-UTRAN); X2 application protocol (X2AP)(Release 11)", 3GPP TS 36.423 V11.6.0, 3rd Generation Partnership Project, Sep. 2013, Valbonne, France, pp. 1-144.

International Search Report dated Jul. 23, 2014 in corresponding International Patent Application No. PCT/CN2013/085340.

Extended European Search Report dated Aug. 19, 2016 in corresponding European Patent Application No. 13895624.8.

* cited by examiner

SPLITTING METHOD, BASE STATION, AND USER EQUIPMENT

CROSS-REFERENCE TO RELATED APPLICATIONS

This application is a continuation of International Application No. PCT/CN2013/085340, filed on Oct. 16, 2013, which is hereby incorporated by reference in its entirety.

TECHNICAL FIELD

Embodiments of the present invention relate to wireless access technologies, in particular, to a splitting method, a base station, and user equipment, and belongs to the field of wireless communications technologies.

BACKGROUND

With development of mobile communications systems, user services have raised increasingly high requirements for transmission rates. To ensure a transmission rate of a common user without increasing configured bandwidth and to provide a higher throughput to the user, a carrier aggregation (Carrier Aggregation, CA for short) technology is introduced in the 3rd Generation Partnership Project (The 3rd Generation Partnership Project, 3GPP for short). Carrier aggregation refers to that user equipment (User Equipment, UE for short) can simultaneously use multiple component carriers (Component Carrier, CC for short) to perform uplink and downlink communication, so that high-speed data transmission is supported.

According to types of aggregated carriers, there are two categories: carrier aggregation in a same system and carrier aggregation in different systems. The carrier aggregation in a same system refers to that all carriers used by UE are carriers in a same system. For example, all carriers belong to a Long Term Evolution (Long Term Evolution, LTE for short) system, or all carriers belong to a Universal Mobile Telecommunications System (Universal Mobile Telecommunications System, UMTS for short). The carrier aggregation in different systems refers to that carriers used by UE belong to different systems. For example, carriers belong to an LTE system and a UMTS system, an LTE system and a wireless local area network (Wireless Local Access Network, WLAN for short) system, or a UMTS system and a WLAN system. The carrier aggregation in different systems may fully take advantage of characteristics of various communications systems, to achieve transmission effects of high efficiency and low costs.

In the prior art, when carrier aggregation in different systems that include a WLAN is used to perform data splitting, a data service interruption may occur, which affects a transmission rate.

SUMMARY

Embodiments of the present invention provide a splitting method, a base station, and a user equipment, so as to implement data splitting in carrier aggregation in different systems, and resolve a problem that when carrier aggregation in different systems that include a WLAN is used to split a data service, the data service is interrupted during splitting due to a relatively long delay in authentication to the WLAN.

According to a first aspect, an embodiment of the present invention provides a splitting method, including:

sending, by a base station, an authentication indication to user equipment, where the authentication indication is used to instruct the user equipment to initiate authentication to a wireless local area network WLAN, the base station implements wireless communication based on a cellular radio communications technology, and the WLAN implements wireless communication based on a wireless fidelity Wi-Fi access technology;

acquiring, by the base station, an authentication status report indicating that the user equipment is admitted to the WLAN; and determining, by the base station according to the authentication status report, that the base station exchanges, with an access point of the WLAN, a first data stream of a data stream to be processed, where the data stream to be processed is a data stream that is to be sent by the base station to the user equipment or a data stream that is to be sent by the user equipment to the base station.

With reference to the first aspect, in a first possible implementation manner of the first aspect, the sending, by a base station, an authentication indication to user equipment specifically includes:

sending, by the base station, the authentication indication to the user equipment, where the authentication indication includes an identifier of the WLAN, so that the user equipment performs the authentication to the WLAN according to the identifier of the WLAN.

With reference to the first aspect or the first possible implementation manner of the first aspect, in a second possible implementation manner of the first aspect, the method further includes:

acquiring, by the base station, a key through the authentication, where the key is used by the user equipment and the base station to encrypt/decrypt a second data stream of the data stream to be processed, and the second data stream is a data stream that is sent by the base station to the user equipment based on the cellular radio communications technology;

indicating, by the base station to the access point of the WLAN, that the user equipment is a trusted device, where the trusted device represents that the user equipment is admitted to the access point of the WLAN through the authentication; and sending, by the base station, the key to the access point of the WLAN, where the key is further used by the user equipment and the access point of the WLAN to encrypt/decrypt the first data stream.

With reference to the first aspect and the first and second possible implementation manners of the first aspect, in a third possible implementation manner of the first aspect, the method further includes:

receiving, by the base station by using an uplink tunnel between the base station and the user equipment, an authentication request sent by the user equipment, where the authentication request is used by the user equipment to initiate the authentication; and sending, by the base station, the authentication request to the authentication server, so that the authentication server and the user equipment perform the authentication by using a downlink tunnel.

According to a second aspect, an embodiment of the present invention provides a splitting method, including:

receiving, by user equipment, an authentication indication sent by a base station, where the authentication indication is used to instruct the user equipment to initiate authentication to a wireless local area network WLAN, the base station implements wireless communication based on a cellular radio communications technology, and the WLAN implements wireless communication based on a wireless fidelity Wi-Fi access technology;

sending, by the user equipment to the base station, an authentication status report indicating that the user equipment is admitted to the WLAN; and exchanging, by the user equipment with the base station by using an access point of the WLAN, a first data stream of a data stream to be processed, where the data stream to be processed is a data stream that is to be sent by the base station to the user equipment or a data stream that is to be sent by the user equipment to the base station.

In a first possible implementation manner of the second aspect, the authentication indication includes an identifier of the WLAN, and the method further includes:

performing, by the user equipment, the authentication to the WLAN according to the identifier of the WLAN.

With reference to the second aspect or the first possible implementation manner of the second aspect, in a second possible implementation manner of the second aspect, the method further includes:

completing, by the user equipment by using the access point of the WLAN or the base station, an authentication process in which the user equipment is admitted to the WLAN.

With reference to the second aspect and the first and second possible implementation manners of the second aspect, in a third possible implementation manner of the second aspect, the method further includes:

encrypting/decrypting, by the user equipment by using a key that is acquired by the base station through the authentication, a second data stream, which is transmitted between the user equipment and the base station, of the data stream to be processed, where the second data stream is a data stream that is sent by the base station to the user equipment based on the cellular radio communications technology; and encrypting/decrypting, by the user equipment by using the key, the first data stream, which is transmitted between the user equipment and the access point of the WLAN, of the data stream to be processed.

With reference to the second aspect and the first to third possible implementation manners of the second aspect, in a fourth possible implementation manner of the second aspect, the method further includes:

sending, by the user equipment, an authentication request to the base station by using an uplink tunnel between the user equipment and the base station, where the authentication request is used by the user equipment to initiate the authentication.

According to a third aspect, an embodiment of the present invention provides a base station, including:

a sending unit, configured to send an authentication indication to user equipment, where the authentication indication is used to instruct the user equipment to initiate authentication to a wireless local area network WLAN, the base station implements wireless communication based on a cellular radio communications technology, and the WLAN implements wireless communication based on a wireless fidelity Wi-Fi access technology;

an acquiring unit, configured to acquire an authentication status report indicating that the user equipment is admitted to the WLAN; and a splitting unit, configured to determine, according to the authentication status report, that the base station exchanges, with an access point of the WLAN, a first data stream of a data stream to be processed, where the data stream to be processed is a data stream that is to be sent by the base station to the user equipment or a data stream that is to be sent by the user equipment to the base station.

With reference to the third aspect, in a first possible implementation manner of the third aspect, the sending unit is specifically configured to:

send the authentication indication to the user equipment, where the authentication indication includes an identifier of the WLAN, so that the user equipment performs the authentication to the WLAN according to the identifier of the WLAN.

With reference to the third aspect or the first possible implementation manner of the third aspect, in a second possible implementation manner of the third aspect, the acquiring unit is further configured to acquire a key through the authentication, where the key is used by the user equipment and the base station to encrypt/decrypt a second data stream of the data stream to be processed, and the second data stream is a data stream that is sent by the base station to the user equipment based on the cellular radio communications technology;

the base station further includes an indication unit, configured to indicate, to the access point of the WLAN, that the user equipment is a trusted device, where the trusted device represents that the user equipment is admitted to the access point of the WLAN through the authentication; and the sending unit is further configured to send the key to the access point of the WLAN, where the key is further used by the user equipment and the access point of the WLAN to encrypt/decrypt the first data stream.

With reference to the third aspect and the first and second possible implementation manners of the third aspect, in a third possible implementation manner of the third aspect, the acquiring unit is further configured to receive, by using an uplink tunnel between the base station and the user equipment, an authentication request sent by the user equipment, where the authentication request is used by the user equipment to initiate the authentication; and the sending unit is further configured to send the authentication request to an authentication server, so that the authentication server and the user equipment perform the authentication by using a downlink tunnel.

According to a fourth aspect, an embodiment of the present invention provides user equipment, including:

a receiving unit, configured to receive an authentication indication sent by a base station, where the authentication indication is used to instruct the user equipment to initiate authentication to a wireless local area network WLAN, the base station implements wireless communication based on a cellular radio communications technology, and the WLAN implements wireless communication based on a wireless fidelity Wi-Fi access technology; and a sending unit, configured to send, to the base station, an authentication status report indicating that the user equipment is admitted to the WLAN, where the receiving unit is further configured to exchange, with the base station by using an access point of the WLAN, a first data stream of a data stream to be processed, where the data stream to be processed is a data stream that is to be sent by the base station to the user equipment or a data stream that is to be sent by the user equipment to the base station.

In a first possible implementation manner of the fourth aspect, the authentication indication includes an identifier of the WLAN, and the user equipment further includes:

a processing unit, configured to perform the authentication to the WLAN according to the identifier of the WLAN.

With reference to the fourth aspect or the first possible implementation manner of the fourth aspect, in a second possible implementation manner of the fourth aspect, the processing unit is specifically configured to:

complete, by using the access point of the WLAN or the base station, an authentication process in which the user equipment is admitted to the WLAN.

With reference to the fourth aspect and the first and second possible implementation manners of the fourth aspect, in a third possible implementation manner of the fourth aspect, the user equipment further includes:

an encryption/decryption unit, configured to:

encrypt/decrypt, by using a key that is acquired by the base station through the authentication, a second data stream, which is transmitted between the user equipment and the base station, of the data stream to be processed, where the second data stream is a data stream that is sent by the base station to the user equipment based on the cellular radio communications technology; and encrypt/decrypt, by using the key, the first data stream, which is transmitted between the user equipment and the access point of the WLAN, of the data stream to be processed.

With reference to the fourth aspect and the first to third possible implementation manners of the fourth aspect, in a fourth possible implementation manner of the fourth aspect, the sending unit is further configured to send an authentication request to the base station by using an uplink tunnel between the user equipment and the base station, where the authentication request is used by the user equipment to initiate the authentication.

According to a fifth aspect, an embodiment of the present invention provides a base station, including:

a transmitter, configured to send an authentication indication to user equipment, where the authentication indication is used to instruct the user equipment to initiate authentication to a wireless local area network WLAN, the base station implements wireless communication based on a cellular radio communications technology, and the WLAN implements wireless communication based on a wireless fidelity Wi-Fi access technology;

a receiver, configured to acquire an authentication status report indicating that the user equipment is admitted to the WLAN; and a processor, configured to determine, according to the authentication status report, that the base station exchanges, with an access point of the WLAN, a first data stream of a data stream to be processed, where the data stream to be processed is a data stream that is to be sent by the base station to the user equipment or a data stream that is to be sent by the user equipment to the base station.

With reference to the fifth aspect, in a first possible implementation manner of the fifth aspect, the transmitter is specifically configured to:

send the authentication indication to the user equipment, where the authentication indication includes an identifier of the WLAN, so that the user equipment performs the authentication to the WLAN according to the identifier of the WLAN.

With reference to the fifth aspect or the first possible implementation manner of the fifth aspect, in a second possible implementation manner of the fifth aspect, the receiver is further configured to acquire a key through the authentication, where the key is used by the user equipment and the base station to encrypt/decrypt a second data stream of the data stream to be processed, and the second data stream is a data stream that is sent by the base station to the user equipment based on the cellular radio communications technology;

the transmitter is further configured to indicate, to the access point of the WLAN, that the user equipment is a trusted device, where the trusted device represents that the user equipment is admitted to the access point of the WLAN through the authentication; and the transmitter is further configured to send the key to the access point of the WLAN, where the key is further used by the user equipment and the access point of the WLAN to encrypt/decrypt the first data stream.

With reference to the fifth aspect and the first and second possible implementation manners of the fifth aspect, in a third possible implementation manner of the fifth aspect, the receiver is further configured to receive, by using an uplink tunnel between the base station and the user equipment, an authentication request sent by the user equipment, where the authentication request is used by the user equipment to initiate the authentication; and the transmitter is further configured to send the authentication request to an authentication server, so that the authentication server and the user equipment perform the authentication by using a downlink tunnel.

According to a sixth aspect, an embodiment of the present invention provides user equipment, including:

a receiver, configured to receive an authentication indication sent by a base station, where the authentication indication is used to instruct the user equipment to initiate authentication to a wireless local area network WLAN, the base station implements wireless communication based on a cellular radio communications technology, and the WLAN implements wireless communication based on a wireless fidelity Wi-Fi access technology; and a transmitter, configured to send, to the base station, an authentication status report indicating that the user equipment is admitted to the WLAN, where the receiver is further configured to exchange, with the base station by using an access point of the WLAN, a first data stream of a data stream to be processed, where the data stream to be processed is a data stream that is to be sent by the base station to the user equipment or a data stream that is to be sent by the user equipment to the base station.

In a first possible implementation manner of the sixth aspect, the authentication indication includes an identifier of the WLAN, and the user equipment further includes:

a processor, configured to perform the authentication to the WLAN according to the identifier of the WLAN.

With reference to the sixth aspect or the first possible implementation manner of the sixth aspect, in a second possible implementation manner of the sixth aspect, the processor is specifically configured to:

complete, by using the access point of the WLAN or the base station, an authentication process in which the user equipment is admitted to the WLAN.

With reference to the sixth aspect and the first and second possible implementation manners of the sixth aspect, in a third possible implementation manner of the sixth aspect, the processor is further configured to:

encrypt/decrypt, by using a key that is acquired by the base station through the authentication, a second data stream, which is transmitted between the user equipment and the base station, of the data stream to be processed, where the second data stream is a data stream that is sent by the base station to the user equipment based on the cellular radio communications technology; and encrypt/decrypt, by using the key, the first data stream, which is transmitted between the user equipment and the access point of the WLAN, of the data stream to be processed.

With reference to the sixth aspect and the first to third possible implementation manners of the sixth aspect, in a fourth possible implementation manner of the sixth aspect, the transmitter is further configured to:

send an authentication request to the base station by using an uplink tunnel between the user equipment and the base station, where the authentication request is used by the user equipment to initiate the authentication.

According to the present invention, a base station sends an authentication indication to user equipment in advance before data splitting, which implements that the base station splits service data according to an authentication status report, and avoids that authentication to a WLAN is performed only during splitting of the service data. Therefore, a problem in the prior art that a data service is interrupted during splitting due to a relatively long delay in authentication to the WLAN is resolved.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Various technologies described in this specification may be applied to various wireless communications systems, for example, current 2G and 3G communications systems and a next-generation communications system, for example, a Global System for Mobile Communications (GSM, Global System for Mobile communications), a Code Division Multiple Access (CDMA, Code Division Multiple Access) system, a Time Division Multiple Access (TDMA, Time Division Multiple Access) system, Wideband Code Division Multiple Access (WCDMA, Wideband Code Division Multiple Access Wireless), a Frequency Division Multiple Access (FDMA, Frequency Division Multiple Addressing) system, an Orthogonal Frequency Division Multiple Access (OFDMA, Orthogonal Frequency-Division Multiple Access) system, a single-carrier FDMA (SC-FDMA) system, a general packet radio service (GPRS, General Packet Radio Service) system, a Long Term Evolution (LTE, Long Term Evolution) system, and other communications systems.

In this specification, various aspects are described with reference to a terminal and/or a base station and/or a base station controller.

The terminal may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges language and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The base station (for example, an access point) may refer to a device in communication with a wireless terminal via one or more sectors at an air interface in an access network. The base station may be used to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base station (BTS, Base Transceiver Station) in GSM or CDMA, or may be a NodeB (NodeB) in WCDMA, or may be an evolved NodeB (NodeB, eNB, or e-NodeB, evolutional Node B) in LTE, which is not limited in the present invention.

Figure 1:
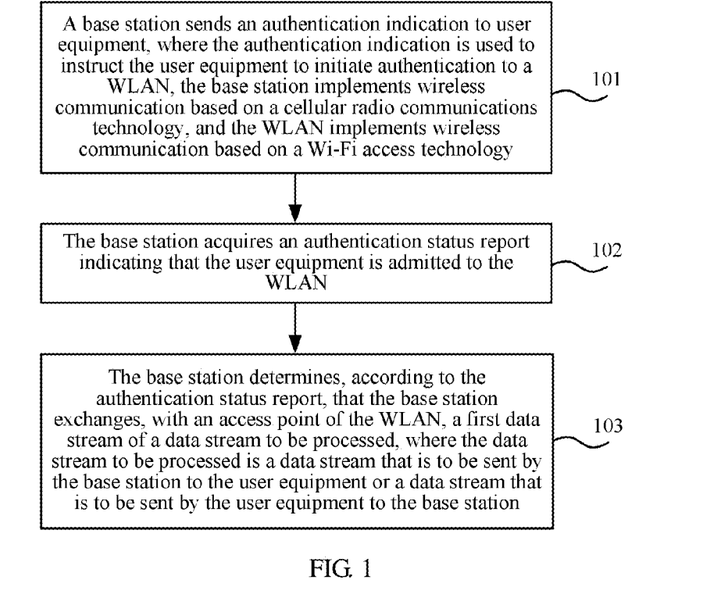
FIG. 1 is a flowchart of Embodiment 1 of a splitting method according to the present invention.

FIG. 1 is a flowchart of Embodiment 1 of a splitting method according to the present invention. The method in this embodiment is applicable to a wireless communications system, and is executed by a base station. As shown in FIG. 1, the method includes the following steps:

Step 101: A base station sends an authentication indication to user equipment, where the authentication indication is used to instruct the user equipment to initiate authentication to a WLAN, the base station implements wireless communication based on a cellular radio communications technology, and the WLAN implements wireless communication based on a wireless fidelity (wireless fidelity, Wi-Fi for short) access technology.

Optionally, in specific implementation, the base station may send the authentication indication for the WLAN to the user equipment in a broadcasting manner.

Alternatively, the base station may also send the authentication indication for the WLAN to the user equipment by using radio resource control (Radio Resource Control, RRC for short) signaling.

Optionally, the sending, by a base station, an authentication indication to user equipment specific ally includes:

sending, by the base station, the authentication indication to the user equipment, where the authentication indication includes an identifier of the WLAN, so that the user equipment performs the authentication to the WLAN according to the identifier of the WLAN. The identifier is, for example, a basic service set identifier (Basic Service Set Identifier, BSSID for short) and/or a service set identifier (Service Set Identifier, SSID for short).

Optionally, the indication information may further include an indication for allowing an advance authentication indication for the WLAN. For example, a 1-bit Boolean-type indication may be used, and is set to true "True", which indicates that the user equipment is allowed to perform advance authentication to the WLAN.

Step 102: The base station acquires an authentication status report indicating that the user equipment is admitted to the WLAN.

If the authentication indication, which is sent by the base station, for the WLAN is received, the user equipment selects, according to related content in the indication information, for example, the identifier of the WLAN or whether the user equipment is allowed to perform advance authentication to the WLAN, to perform authentication to a related WLAN. For example, an authentication method, such as web page (WEB) authentication or Extensible Authentication Protocol-subscriber identity modules/authentication and key agreement protocol (extensible authentication protocol-Subscriber Identity Modules/Authentication and Key Agreement, EAP-SIM/AKA for short) authentication may be used. It should be noted that when the authentication indication information does not include an identifier of a specified WLAN, the user equipment may also select a related WLAN as a specified WLAN according to a network status of the user equipment, so as to perform authentication.

Optionally, the acquiring, by the base station, an authentication status report indicating that the user equipment is admitted to the WLAN includes: receiving, by the base station, the authentication status report for the WLAN, which is sent by the user equipment after an authentication process is completed; or receiving, by the base station, the authentication status report for the WLAN, which is sent by the WLAN after an authentication process is completed. Descriptions are provided below in detail by using examples. After completing the authentication process, the user equipment may directly send the authentication status report to the base station. The authentication status report may be completed by using an RRC message, and after receiving the authentication status report from the user equipment, the base station may return an acknowledgment message to the user equipment. The base station may store the authentication status report, or may forward the authentication status report to a mobility management entity (Mobility Management Entity, MME for short) for storage.

Alternatively, after the authentication process is completed, the WLAN sends an authentication status notification message to the base station. The authentication status notification message may be forwarded to the base station by using the MME, and the base station may obtain, by parsing the authentication status notification message, information related to a pre-registration status update notification.

Step 103: The base station determines, according to the authentication status report, that the base station exchanges, with an access point of the WLAN, a first data stream of a data stream to be processed, where the data stream to be processed is a data stream that is to be sent by the base station to the user equipment or a data stream that is to be sent by the user equipment to the base station.

In this step, when making a WLAN data splitting decision, the base station refers to a current authentication status of the user equipment, that is, only user equipment that succeeds in authentication and the WLAN may perform data splitting. Optionally, when performing splitting, the base station may further consider a service traffic factor. For example, if a data service has a higher requirement for reliability of data transmission, because of a switching packet loss rate of the WLAN, the base station may consider that carrier aggregation is not selected for splitting. However, in a case of heavier data service traffic and a smaller coverage area, carriers may be preferentially considered for splitting, especially in a network environment that is relatively static and involves movement indoors.

Compared with the prior art in which a base station performs authentication on a WLAN only during data splitting, and a data service is interrupted during splitting due to a relatively long delay in authentication to the WLAN, in this embodiment, the authentication indication for the WLAN is sent to the user equipment in advance, which implements that the base station directly performs splitting according to the authentication status report for the WLAN during data categorization, and avoids that authentication is performed to the WLAN only during service data splitting, so that seamless splitting is implemented.

Optionally, based on this embodiment, the method further includes:

acquiring, by the base station, a key through the authentication, where the key is used by the user equipment and the base station to encrypt/decrypt a second data stream of the data stream to be processed, and the second data stream is a data stream that is exchanged by the base station with the user equipment based on the cellular radio communications technology;

indicating, by the base station to the access point of the WLAN, that the user equipment is a trusted device, where the trusted device represents that the user equipment is admitted to the access point of the WLAN through the authentication; and sending, by the base station, the key to the access point of the WLAN, where the key is further used by the user equipment and the access point of the WLAN to encrypt/decrypt the first data stream.

By means of the foregoing technical solution, a base station indicates that a key used in a WLAN may be a key used for transmitting data between the base station and user equipment. In this way, keys used for exchanging a first data stream and a second data stream between the WLAN, the base station, and the user equipment are consistent, thereby avoiding complex processing that is caused by use of multiple keys when the base station performs data splitting. Further, it is indicated that the user equipment is trusted user equipment, thereby implementing that an authentication success is directly returned after an authentication request sent by the user equipment is received, and the authentication request no longer needs to be forwarded to an authentication server for authentication, which improves authentication efficiency.

Optionally, based on this embodiment, the method further includes:

receiving, by the base station by using an uplink tunnel between the base station and the user equipment, an authentication request sent by the user equipment, where the authentication request is used by the user equipment to initiate the authentication; and sending, by the base station, the authentication request to an authentication server, so that the authentication server and the user equipment perform the authentication by using a downlink tunnel.

Figure 2:
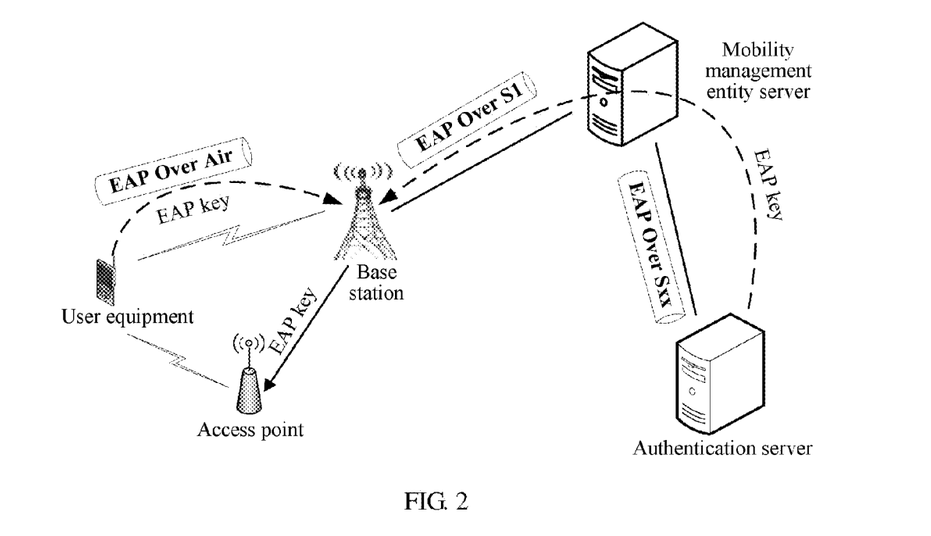
FIG. 2 is a network topology diagram of performing authentication by user equipment in a tunneling manner.

FIG. 2 is a network topology diagram of performing authentication by user equipment in a tunneling manner. An LTE system is used as an example, and as shown in FIG. 2, this network architectural diagram includes user equipment, an access point of a WLAN, a base station, a mobility management entity server, and an authentication server. First, the user equipment sends an uplink information transfer (UL Information Transfer) message to the base station; an EAP-SIM authentication message is encapsulated in the UL Information Transfer message and is transparently transmitted from a terminal to the base station; authentication WLAN routing information is used to identify a WLAN network of an authentication object; the base station sends an uplink WLAN authentication and key agreement protocol (Uplink WLAN AKA Tunneling) message to the authentication server via an MME; the authentication server identifies that an authentication method to be used by a user is EAP-AKA. An authentication message is exchanged by using a downlink tunnel message; after authentication is completed between the user equipment and the authentication server, the authentication server sends an EAP success (EAP Success) message to the base station, and sends, to the base station, an authentication key of confidentiality and/or integrity protection for protecting a link between an access point of a WLAN and user equipment of the WLAN. Alternatively, the user equipment sends a related key to the base station; the base station, as a portion of a context of the user equipment, stores the key. When the base station selects the WLAN to split data, the base station sends an authentication success identifier and a related key to the access point of the WLAN; the user equipment accesses the access point of the WLAN, and uses the related key to perform encryption and integrity protection.

By means of the foregoing technical solution, user equipment and an authentication server may use, for authentication, an uplink tunnel and a downlink tunnel that are established by the user equipment and the authentication server, where the uplink tunnel and the downlink tunnel pass through the base station, which improves security and reliability of authentication.

Figure 3:
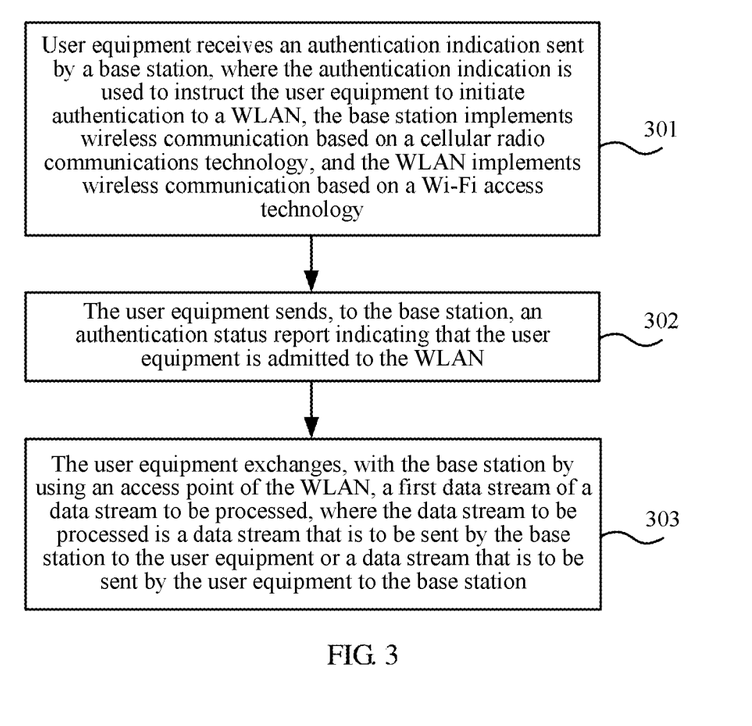
FIG. 3 is a schematic flowchart of Embodiment 2 of a splitting method according to the present invention.

FIG. 3 is a flowchart of Embodiment 1 of a splitting method according to the present invention. The method in this embodiment is applicable to a wireless communications system, for example, a 2G/3G/4G communications system, and is executed by user equipment, for example, a smartphone. As shown in FIG. 3, the method includes the following steps:

Step 301: User equipment receives an authentication indication sent by a base station, where the authentication indication is used to instruct the user equipment to initiate authentication to a WLAN, the base station implements wireless communication based on a cellular radio communications technology, and the WLAN implements wireless communication based on a Wi-Fi access technology.

Optionally, the authentication indication includes an identifier of the WLAN, and the method further includes:

performing, by the user equipment, the authentication to the WLAN according to the identifier of the WLAN, where the identifier is, for example, a BSSID or an SSID.

Step 302: The user equipment sends, to the base station, an authentication status report indicating that the user equipment is admitted to the WLAN.

After receiving the authentication indication, the user equipment initiates authentication to the wireless local area network WLAN, and in specific implementation, optionally, the method may include:

completing, by the user equipment by using the access point of the WLAN or the base station, an authentication process in which the user equipment is admitted to the WLAN.

After completing the authentication process in which the user equipment is admitted to the WLAN, the user equipment sends the authentication status report to the base station.

Step 303: The user equipment exchanges, with the base station by using an access point of the WLAN, a first data stream of a data stream to be processed, where the data stream to be processed is a data stream that is to be sent by the base station to the user equipment or a data stream that is to be sent by the user equipment to the base station.

In this embodiment, the UE receives the authentication indication sent by the base station, and performs authentication to the WLAN, which participates in splitting, in advance, so as to resolve a problem in the prior art in which authentication is performed to a WLAN only during data splitting, and a service is interrupted during splitting due to a relatively long time in the authentication to the WLAN, thereby implementing seamless switching when service data is split by using carriers.

Optionally, based on this embodiment, the method further includes:

encrypting/decrypting, by the user equipment by using a key that is acquired by the base station through the authentication, a second data stream, which is transmitted between the user equipment and the base station, of the data stream to be processed, where the second data stream is a data stream that is exchanged by the base station with the user equipment based on the cellular radio communications technology; and encrypting/decrypting, by the user equipment by using the key, the first data stream, which is transmitted between the user equipment and the access point of the WLAN, of the data stream to be processed.

By means of the foregoing technical solution, user equipment encrypts/decrypts, by using a key that is acquired by a base station through authentication, a first data stream and a second data stream of a data stream to be processed. In this way, keys used for exchanging the first data stream and the second data stream between the WLAN, the base station, and the user equipment are consistent, thereby avoiding complex processing that is caused by use of multiple keys when the base station performs data splitting. Further, it is indicated that the user equipment is trusted user equipment, thereby implementing that an authentication success is directly returned after an authentication request sent by the user equipment is received, and the authentication request no longer needs to be forwarded to an authentication server for authentication, which improves authentication efficiency.

Optionally, based on this embodiment, the user equipment sends an authentication request to the base station by using an uplink tunnel between the user equipment and the base station, where the authentication request is used by the user equipment to initiate the authentication.

By means of the foregoing technical solution, the user equipment and the authentication server may use, for authentication, an uplink tunnel and a downlink tunnel that are established by the user equipment and the authentication server, where the uplink tunnel and the downlink tunnel pass through the base station, which improves security and reliability of authentication.

Figure 4:
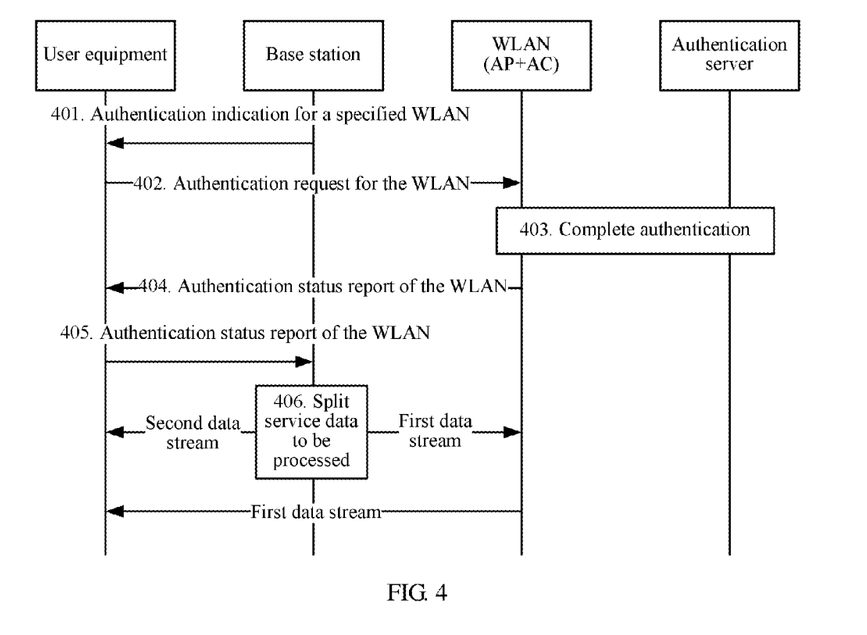
FIG. 4 is a signaling interaction diagram of Embodiment 3 of a splitting method according to the present invention.

FIG. 4 is a signaling interaction diagram of Embodiment 3 of a splitting method according to the present invention. This embodiment includes a specific interaction process between a base station, user equipment, and a WLAN. This signaling interaction specifically includes:

Step 401: A base station sends an authentication indication for a specified WLAN to user equipment.

In specific implementation, identifier information of the WLAN may be included, or may not be included. If the authentication indication does not include an identifier of the WLAN, the user equipment performs an admission authentication operation on all detected access points of the WLAN.

Step 402: The user equipment sends an authentication request for the WLAN to the WLAN.

In specific implementation, either authentication method of WEB or EAP-SIM/AKA may be used. If the indication information includes the identifier of the specified WLAN, the authentication request is sent to the specified WLAN; if the indication information does not include the identifier of the specified WLAN, the user equipment specifies a WLAN according to a network status of the user equipment and sends the authentication request to the specified WLAN.

Step 403: Complete authentication between the WLAN and an authentication server according to the authentication request for the WLAN.

Step 404: The WLAN sends an authentication status report of the WLAN to the user equipment.

In this step, the WLAN may also directly send the authentication status report to the base station, and the base station forwards the authentication status report to the user equipment.

Step 405: The user equipment forwards the authentication status report of the WLAN to the base station.

Step 406: The base station categorizes a data service to be processed.

The base station sends a first data stream in the data service to be processed to the user equipment via the WLAN, and the base station directly sends the second data stream to the user equipment, so that splitting of service data is implemented.

In the foregoing technical solution, before performing data splitting, a base station sends an authentication indication to user equipment, and when performing data splitting, the base station directly categorizes a data service according to an authentication status report of a WLAN, directly sends a part of the data service to the user equipment by using a wireless communications system, and forwards another part of the data service to the user equipment by using the WLAN, so that seamless splitting is implemented.

Figure 5:
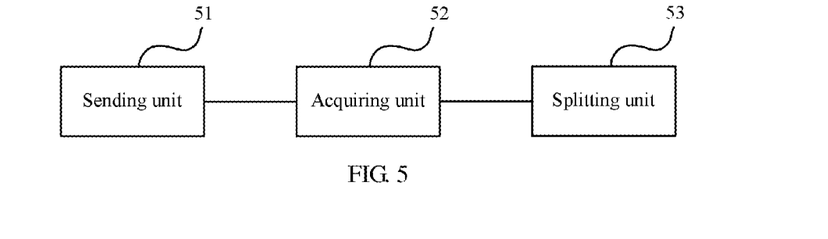
FIG. 5 is a structural diagram of Embodiment 1 of a base station according to the present invention.

FIG. 5 is a structural diagram of Embodiment 1 of a base station according to the present invention. The base station may be applied to a 2G/3G/4G wireless communications system, for example, an eNodeB in an LTE system. The base station includes:

a sending unit 51, configured to send an authentication indication to user equipment, where the authentication indication is used to instruct the user equipment to initiate authentication to a wireless local area network WLAN, the base station implements wireless communication based on a cellular radio communications technology, and the WLAN implements wireless communication based on a wireless fidelity Wi-Fi access technology;

an acquiring unit 52, configured to acquire an authentication status report indicating that the user equipment is admitted to the WLAN; and a splitting unit 53, configured to determine, according to the authentication status report, that the base station exchanges, with an access point of the WLAN, a first data stream of a data stream to be processed, where the data stream to be processed is a data stream that is to be sent by the base station to the user equipment or a data stream that is to be sent by the user equipment to the base station.

The apparatus in this embodiment is configured to perform the technical solution of the embodiment of the method shown in FIG. 1. The implementation principles and technical effects thereof are similar, and are not described herein again.

Figure 6:
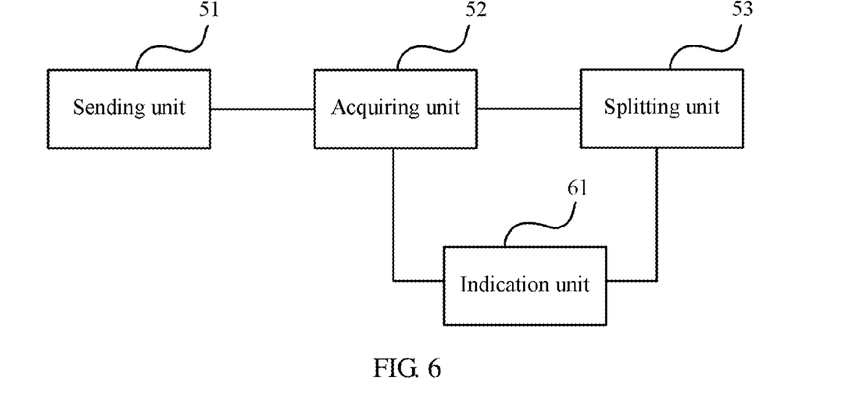
FIG. 6 is a structural diagram of Embodiment 2 of a base station according to the present invention.

FIG. 6 is a structural diagram of Embodiment 2 of a base station according to the present invention. As shown in FIG. 6, the base station in this embodiment is based on a structure of the base station shown in FIG. 5. Optionally, the sending unit 51 is specifically configured to:

send the authentication indication to the user equipment, where the authentication indication includes an identifier of the WLAN, so that the user equipment performs the authentication to the WLAN according to the identifier of the WLAN.

Optionally, the acquiring unit 52 is further configured to acquire a key through the authentication, where the key is used by the user equipment and the base station to encrypt/decrypt a second data stream of the data stream to be processed, and the second data stream is a data stream that is sent by the base station to the user equipment based on the cellular radio communications technology;

the base station further includes an indication unit 61, configured to indicate, to the access point of the WLAN, that the user equipment is a trusted device, where the trusted device represents that the user equipment is admitted to the access point of the WLAN through the authentication; and the sending unit 51 is further configured to send the key to the access point of the WLAN, where the key is further used by the user equipment and the access point of the WLAN to encrypt/decrypt the first data stream.

Optionally, the acquiring unit 52 is further configured to receive, by using an uplink tunnel between the base station and the user equipment, an authentication request sent by the user equipment, where the authentication request is used by the user equipment to initiate the authentication; and the sending unit 51 is further configured to send the authentication request to an authentication server, so that the authentication server and the user equipment perform the authentication by using a downlink tunnel.

In the foregoing embodiment, the indication unit in the base station indicates that the user equipment is trusted user equipment, an authentication success is directly returned after an authentication request sent by the user equipment is received, and the authentication request no longer needs to be forwarded to an authentication server for authentication, so that authentication efficiency is improved. Moreover, the acquiring unit of the base station acquires a key through the authentication, and the sending unit sends the key to an access point of the WLAN, so that a key used in the WLAN may be a key used for transmitting data between the base station and the user equipment. In this way, keys used for exchanging a first data stream and a second data stream between the WLAN, the base station, and the user equipment are consistent, thereby avoiding complex processing that is caused by use of multiple keys when the base station performs data splitting.

Figure 7:
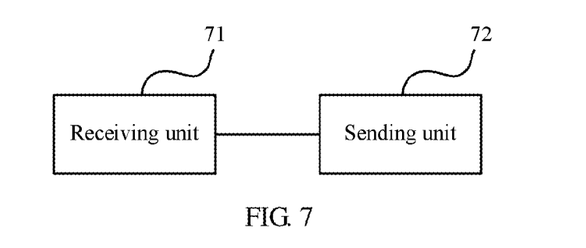
FIG. 7 is a structural diagram of Embodiment 1 of user equipment according to the present invention.

FIG. 7 is a structural diagram of Embodiment 1 of user equipment according to the present invention. The user equipment may be applied to a 2G/3G/4G wireless communications system. The user equipment includes:

a receiving unit 71, configured to receive an authentication indication sent by a base station, where the authentication indication is used to instruct the user equipment to initiate authentication to a wireless local area network WLAN, the base station implements wireless communication based on a cellular radio communications technology, and the WLAN implements wireless communication based on a wireless fidelity Wi-Fi access technology; and a sending unit 72, configured to send, to the base station, an authentication status report indicating that the user equipment is admitted to the WLAN, where the receiving unit 71 is further configured to exchange, with the base station by using an access point of the WLAN, a first data stream of a data stream to be processed, where the data stream to be processed is a data stream that is to be sent by the base station to the user equipment or a data stream that is to be sent by the user equipment to the base station.

The apparatus in this embodiment is configured to perform the technical solution of the embodiment of the method shown in FIG. 3. The implementation principles and technical effects thereof are similar, and are not described herein again.

Figure 8:
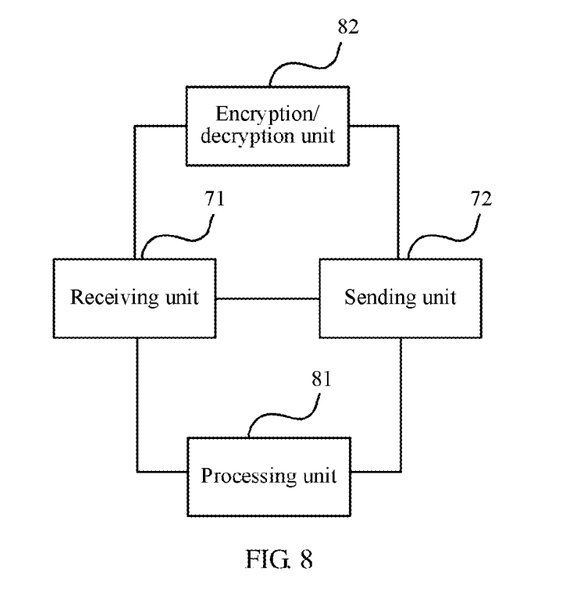
FIG. 8 is a structural diagram of Embodiment 2 of user equipment according to the present invention.

FIG. 8 is a structural diagram of Embodiment 2 of user equipment according to the present invention. As shown in FIG. 8, the user equipment in this embodiment is based on a structure of the user equipment shown in FIG. 7. Optionally, the user equipment further includes:

a processing unit 81, configured to perform authentication to the WLAN according to an identifier of the WLAN.

Optionally, the processing unit 81 is specifically configured to:

complete, by using the access point of the WLAN or the base station, an authentication process in which the user equipment is admitted to the WLAN.

Optionally, the user equipment further includes:

an encryption/decryption unit 82, configured to:

encrypt/decrypt, by using a key that is acquired by the base station through the authentication, a second data stream, which is transmitted between the user equipment and the base station, of the data stream to be processed, where the second data stream is a data stream that is sent by the base station to the user equipment based on the cellular radio communications technology; and encrypt/decrypt, by using the key, the first data stream, which is transmitted between the user equipment and the access point of the WLAN, of the data stream to be processed.

Optionally, the sending unit 72 is further configured to send an authentication request to the base station by using an uplink tunnel between the user equipment and the base station, where the authentication request is used by the user equipment to initiate the authentication.

In the foregoing embodiment, the user equipment sends an authentication request to a base station by using the sending unit and by using an uplink tunnel between the user equipment and the base station, so as to improve security and reliability of authentication.

Moreover, the user equipment encrypts/decrypts, by using the sending unit and the receiving unit and by using a key that is acquired by the base station through the authentication, a first data stream and a second data stream of a data stream to be processed. In this way, keys used for exchanging the first data stream and the second data stream between a WLAN, the base station, and the user equipment are consistent, thereby avoiding complex processing that is caused by use of multiple keys when the base station performs data splitting.

Figure 9:
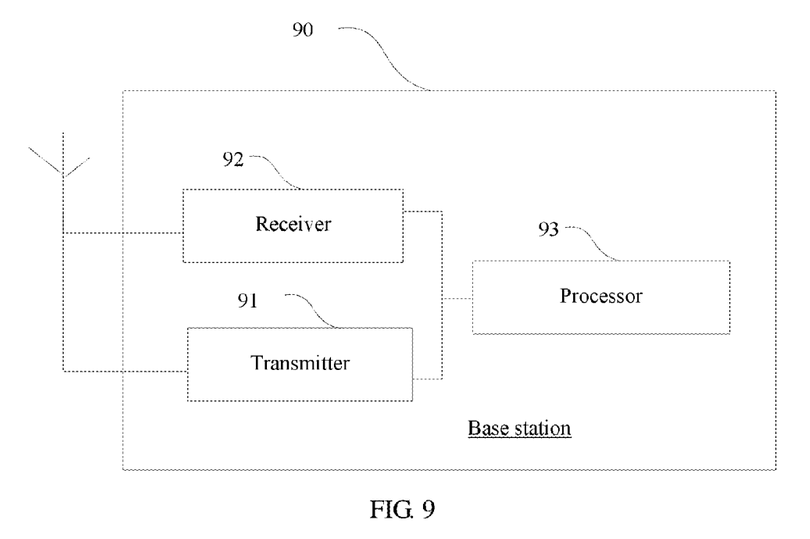
FIG. 9 is a structural diagram of Embodiment 3 of a base station according to the present invention.

FIG. 9 is a structural diagram of Embodiment 3 of a base station according to the present invention. As shown in FIG. 9, the base station 90 provided in this embodiment includes:

a transmitter 91, configured to send an authentication indication to user equipment, where the authentication indication is used to instruct the user equipment to initiate authentication to a WLAN, the base station implements wireless communication based on a cellular radio communications technology, and the WLAN implements wireless communication based on a Wi-Fi access technology;

a receiver 92, configured to acquire an authentication status report indicating that the user equipment is admitted to the WLAN; and a processor 93, configured to determine, according to the authentication status report, that the base station exchanges, with an access point of the WLAN, a first data stream of a data stream to be processed, where the data stream to be processed is a data stream that is to be sent by the base station to the user equipment or a data stream that is to be sent by the user equipment to the base station.

Optionally, based on this embodiment, the transmitter 91 is specifically configured to:

send the authentication indication to the user equipment, where the authentication indication includes an identifier of the WLAN, so that the user equipment performs the authentication to the WLAN according to the identifier of the WLAN.

Optionally, based on this embodiment, the receiver 92 is further configured to acquire a key through the authentication, where the key is used by the user equipment and the base station to encrypt/decrypt a second data stream of the data stream to be processed, and the second data stream is a data stream that is sent by the base station to the user equipment based on the cellular radio communications technology;

the transmitter 91 is further configured to indicate, to the access point of the WLAN, that the user equipment is a trusted device, where the trusted device represents that the user equipment is admitted to the access point of the WLAN through the authentication; and the transmitter 91 is further configured to send the key to the access point of the WLAN, where the key is further used by the user equipment and the access point of the WLAN to encrypt/decrypt the first data stream.

Optionally, based on this embodiment, the receiver 92 is further configured to receive, by using an uplink tunnel between the base station and the user equipment, an authentication request sent by the user equipment, where the authentication request is used by the user equipment to initiate the authentication; and the transmitter 91 is further configured to send the authentication request to an authentication server, so that the authentication server and the user equipment perform the authentication by using a downlink tunnel.

In the foregoing embodiment, the processor 93 executes the execution instruction, so that the base station performs the method described in FIG. 1. The implementation principles and technical effects thereof are similar, and are not described herein again.

Figure 10:
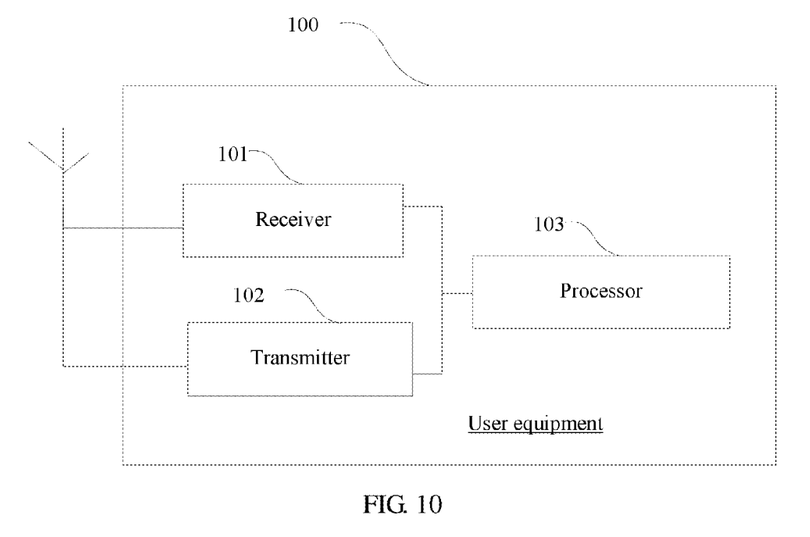
FIG. 10 is a structural diagram of Embodiment 3 of user equipment according to the present invention.

FIG. 10 is a structural diagram of Embodiment 3 of user equipment according to the present invention. As shown in FIG. 10, the user equipment 100 provided in this embodiment includes:

a receiver 101, configured to receive an authentication indication sent by a base station, where the authentication indication is used to instruct the user equipment to initiate authentication to a WLAN, the base station implements wireless communication based on a cellular radio communications technology, and the WLAN implements wireless communication based on a Wi-Fi access technology; and a transmitter 102, configured to send, to the base station, an authentication status report indicating that the user equipment is admitted to the WLAN, where the receiver 101 is further configured to exchange, with the base station by using an access point of the WLAN, a first data stream of a data stream to be processed, where the data stream to be processed is a data stream that is to be sent by the base station to the user equipment or a data stream that is to be sent by the user equipment to the base station.

Optionally, the authentication indication includes an identifier of the WLAN, and the user equipment further includes:

a processor 103, configured to perform the authentication to the WLAN according to the identifier of the WLAN.

Optionally, the processor 103 is specifically configured to:

complete, by using the access point of the WLAN or the base station, an authentication process in which the user equipment is admitted to the WLAN.

Optionally, the processor 103 is further configured to:

encrypt/decrypt, by using a key that is acquired by the base station through the authentication, a second data stream, which is transmitted between the user equipment and the base station, of the data stream to be processed, where the second data stream is a data stream that is sent by the base station to the user equipment based on the cellular radio communications technology; and encrypt/decrypt, by using the key, the first data stream, which is transmitted between the user equipment and the access point of the WLAN, of the data stream to be processed.

Optionally, the transmitter 102 is further configured to:

send, by using an uplink tunnel between the user equipment and the base station, an authentication request to the base station, where the authentication request is used by the user equipment to initiate the authentication.

In this embodiment, the processor 103 executes the execution instruction, so that the user equipment performs the method described in FIG. 3. The implementation principles and technical effects thereof are similar, and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A splitting method, comprising:
   sending, by a base station, an authentication indication to user equipment, wherein the authentication indication is used to instruct the user equipment to initiate authentication by a wireless local area network WLAN, the base station implements wireless communication based on a cellular radio communications technology, and the WLAN implements wireless communication based on a wireless fidelity Wi-Fi access technology;
   acquiring, by the base station, an authentication status report indicating that the user equipment is admitted to the WLAN;
   determining, by the base station according to the authentication status report, that the base station exchanges, with an access point of the WLAN, a first data stream of a data stream to be processed, wherein the data stream to be processed is a data stream that is to be sent by the base station to the user equipment or a data stream that is to be sent by the user equipment to the base stations;
   acquiring, by the base station, a key through the authentication, wherein the key is used by the user equipment and the base station to encrypt/decrypt a second data stream of the data stream to be processed, and the second data stream is a data stream that is sent by the base station to the user equipment based on the cellular radio communications technology;
   indicating, by the base station to the access point of the WLAN, that the user equipment is a trusted device, wherein the trusted device represents that the user equipment is admitted to the access point of the WLAN through the authentication; and
   sending, by the base station, the key to the access point of the WLAN, wherein the key is further used by the user equipment and the access point of the WLAN to encrypt/decrypt the first data stream.

2. The method according to claim 1, wherein the sending, by a base station, an authentication indication to user equipment comprises:
   sending, by the base station, the authentication indication to the user equipment, wherein the authentication indication comprises an identifier of the WLAN, so that the user equipment performs the authentication to the WLAN according to the identifier of the WLAN.

3. The method according to claim 1, further comprising:
   receiving, by the base station by using an uplink tunnel between the base station and the user equipment, an authentication request sent by the user equipment, wherein the authentication request is used by the user equipment to initiate the authentication; and
   sending, by the base station, the authentication request to an authentication server, so that the authentication server and the user equipment perform the authentication by using a downlink tunnel.

4. A splitting method, comprising:
   receiving, by user equipment, an authentication indication sent by a base station, wherein the authentication indication is used to instruct the user equipment to initiate authentication by a wireless local area network WLAN, the base station implements wireless communication based on a cellular radio communications technology, and the WLAN implements wireless communication based on a wireless fidelity Wi-Fi access technology;

sending, by the user equipment to the base station, an authentication status report indicating that the user equipment is admitted to the WLAN;

exchanging, by the user equipment with the base station through an access point of the WLAN, a first data stream of a data stream to be processed, wherein the data stream to be processed is a data stream that is to be sent by the base station to the user equipment or a data stream that is to be sent by the user equipment to the base station;

encrypting/decrypting, by the user equipment by using a key that is acquired by the base station through the authentication, a second data stream, which is transmitted between the user equipment and the base station, of the data stream to be processed, wherein the second data stream is a data stream that is sent by the base station to the user equipment based on the cellular radio communications technology; and encrypting/decrypting, by the user equipment by using the key, the first data stream, which is transmitted between the user equipment and the access point of the WLAN, of the data stream to be processed.

5. The method according to claim 4, wherein the authentication indication comprises an identifier of the WLAN, and the method further comprises:

performing, by the user equipment, the authentication to the WLAN according to the identifier of the WLAN.

6. The method according to claim 4, further comprising:
completing, by the user equipment through the access point of the WLAN or the base station, an authentication process in which the user equipment is admitted to the WLAN.

7. The method according to claim 4, further comprising:
sending, by the user equipment, an authentication request to the base station by using an uplink tunnel between the user equipment and the base station, wherein the authentication request is used by the user equipment to initiate the authentication.

8. A base station, comprising:
a transmitter, configured to send an authentication indication to user equipment, wherein the authentication indication is used to instruct the user equipment to initiate authentication by a wireless local area network WLAN, the base station implements wireless communication based on a cellular radio communications technology, and the WLAN implements wireless communication based on a wireless fidelity Wi-Fi access technology;

a receiver, configured to acquire an authentication status report indicating that the user equipment is admitted to the WLAN;

a processor, configured to determine, according to the authentication status report, that the base station exchanges, with an access point of the WLAN, a first data stream of a data stream to be processed, wherein the data stream to be processed is a data stream that is to be sent by the base station to the user equipment or a data stream that is to be sent by the user equipment to the base station;

the receiver is further configured to acquire a key through the authentication, wherein the key is used by the user equipment and the base station to encrypt/decrypt a second data stream of the data stream to be processed, and the second data stream is a data stream that is sent by the base station to the user equipment based on the cellular radio communications technology;

the transmitter is further configured to indicate, to the access point of the WLAN, that the user equipment is a trusted device, wherein the trusted device represents that the user equipment is admitted to the access point of the WLAN through the authentication; and the transmitter is further configured to send the key to the access point of the WLAN, wherein the key is further used by the user equipment and the access point of the WLAN to encrypt/decrypt the first data stream.

9. The base station according to claim 8, wherein the transmitter is configured to:
send the authentication indication to the user equipment, wherein the authentication indication comprises an identifier of the WLAN, so that the user equipment performs the authentication to the WLAN according to the identifier of the WLAN.

10. The base station according to claim 8, wherein
the receiver is further configured to receive, by using an uplink tunnel between the base station and the user equipment, an authentication request sent by the user equipment, wherein the authentication request is used by the user equipment to initiate the authentication; and the transmitter is further configured to send the authentication request to an authentication server, so that the authentication server and the user equipment perform the authentication by using a downlink tunnel.

11. User equipment, comprising:
a receiver configured to receive an authentication indication sent by a base station, wherein the authentication indication is used to instruct the user equipment to initiate authentication by a wireless local area network WLAN, the base station implements wireless communication based on a cellular radio communications technology, and the WLAN implements wireless communication based on a wireless fidelity Wi-Fi access technology; and a transmitter configured to send, to the base station, an authentication status report indicating that the user equipment is admitted to the WLAN, wherein the receiver is further configured to exchange, with the base station by using an access point of the WLAN, a first data stream of a data stream to be processed, wherein the data stream to be processed is a data stream that is to be sent by the base station to the user equipment or a data stream that is to be sent by the user equipment to the base station, wherein the processor is further configured to:
encrypt/decrypt, by using a key that is acquired by the base station through the authentication, a second data stream, which is transmitted between the user equipment and the base station, of the data stream to be processed, wherein the second data stream is a data stream that is sent by the base station to the user equipment based on the cellular radio communications technology; and encrypt/decrypt, by using the key, the first data stream, which is transmitted between the user equipment and the access point of the WLAN, of the data stream to be processed.

12. The user equipment according to claim 11, wherein the authentication indication comprises an identifier of the WLAN, and the user equipment further comprises:

a processor, configured to perform the authentication to the WLAN according to the identifier of the WLAN.

13. The user equipment according to claim 11, wherein the processor is configured to:
complete, by using the access point of the WLAN or the base station, an authentication process in which the user equipment is admitted to the WLAN.

14. The user equipment according to claim 11, wherein the transmitter is further configured to:
send an authentication request to the base station by using an uplink tunnel between the user equipment and the base station, wherein the authentication request is used by the user equipment to initiate the authentication.

* * * * *

UNITED STATES PATENT AND TRADEMARK OFFICE
CERTIFICATE OF CORRECTION

PATENT NO. : 10,123,204 B2
APPLICATION NO. : 15/098776
DATED : November 6, 2018
INVENTOR(S) : Mingzeng Dai et al.

Page 1 of 1

It is certified that error appears in the above-identified patent and that said Letters Patent is hereby corrected as shown below:

In the Claims

Column 18, Line 27, In Claim 1, delete "stations;", and insert -- station; --, therefor.

Signed and Sealed this
Tenth Day of September, 2019

Andrei Iancu
*Director of the United States Patent and Trademark Office*